(12) United States Patent
Purvis et al.

(10) Patent No.: US 9,600,485 B2
(45) Date of Patent: Mar. 21, 2017

(54) CONTEXTUAL MEDIA PRESENTATION

(71) Applicant: Disney Enterprises, Inc., Burbank, CA (US)

(72) Inventors: Christopher Purvis, Estacada, OR (US); Jonathan Ackley, Glendale, CA (US)

(73) Assignee: Disney Enterprises, Inc., Burbank, CA (US)

( * ) Notice: Subject to any disclaimer, the term of this patent is extended or adjusted under 35 U.S.C. 154(b) by 310 days.

(21) Appl. No.: 14/316,738

(22) Filed: Jun. 26, 2014

(65) Prior Publication Data

US 2015/0379019 A1     Dec. 31, 2015

(51) Int. Cl.
*G06F 15/00* (2006.01)
*G06F 13/00* (2006.01)
*G06F 17/30* (2006.01)

(52) U.S. Cl.
CPC .............................. *G06F 17/30056* (2013.01)

(58) Field of Classification Search
CPC ............................ H04N 9/80; G06F 17/30867
USPC .............. 715/760, 763–765; 725/46, 131, 51
See application file for complete search history.

(56) References Cited

U.S. PATENT DOCUMENTS

| | | |
|---|---|---|
| 8,543,516 B2 | 9/2013 | Aravamudan et al. |
| 2007/0192798 A1 | 8/2007 | Morgan |
| 2008/0065638 A1 | 3/2008 | Brodersen et al. |
| 2008/0275974 A1 | 11/2008 | Rackiewicz |
| 2009/0012959 A1 | 1/2009 | Ylivainio et al. |
| 2009/0178081 A1 | 7/2009 | Goldenberg et al. |
| 2010/0083217 A1* | 4/2010 | Dalal ................ G06F 17/30867 717/106 |
| 2013/0177296 A1* | 7/2013 | Geisner ................... H04N 9/80 386/241 |

* cited by examiner

*Primary Examiner* — Kevin Nguyen
(74) *Attorney, Agent, or Firm* — Patent Ingenuity, P.C.; Samuel K. Simpson

(57) ABSTRACT

A process, computer program product, and apparatus provide for a contextual media presentation. The process, computer program product, and apparatus receive a plurality of planned and/or completed user experiences. Further, the process, computer program product, and apparatus select a plurality of media files that are contextually relevant to the received user experiences. In addition, the process, computer program product, and apparatus sort a list of the plurality of media files to generate a sorted list of media files. The process, computer program product, and apparatus send the sorted list of media files to a player for playback.

24 Claims, 5 Drawing Sheets

Itinerary of Planned User Experiences

Theme Park Experience A

Theme Park Experience B

Theme Park Experience C

Theme Park Experience D

Itinerary of Planned User Experiences

Theme Park Experience A

Theme Park Experience B

Theme Park Experience C

Theme Park Experience D

*Figure 3*

CONTEXTUAL MEDIA PRESENTATION

BACKGROUND

1. Field

This disclosure generally relates to the field of media presentations. More particularly, the disclosure relates to media presentations that are based upon a particular context.

2. General Background

Current computerized recommendation systems provide users with recommendations pertaining to media content based upon user profiles, user preferences, previous purchases, products previously reviewed, and/or demographic information. A database may store such information for subsequent retrieval. When a user travels to a destination that provides access to the recommendation system, the data may be retrieved from the database so that the recommendation system may provide a recommendation to a user for the selection of media content.

Further, some computerized recommendation systems allow a user to sort the media content recommendations. For example, a menu may be provided to a user to sort through a list of movies by title, air time, etc. Accordingly, the user may manually organize the recommended media content according to manual inputs.

Such computerized recommendation systems are typically limited to providing recommendations based upon data pertaining to user preferences. A media presentation system is needed to present media content to users based on planned and/or completed user experiences rather than user preferences. Further, an automatic sorting system is needed to automatically sort the presented media content according to an order of the user experiences so that the user may play content in temporal sequence with the user experiences.

SUMMARY

A process, computer program product, and apparatus provide for a contextual media presentation. The process, computer program product, and apparatus receive a plurality of planned and/or completed user experiences. Further, the process, computer program product, and apparatus select a plurality of media files that are contextually relevant to the received user experiences. In addition, the process, computer program product, and apparatus sort a list of the plurality of media files to generate a sorted list of media files. The process, computer program product, and apparatus send the sorted list of media files to a player for playback.

BRIEF DESCRIPTION OF THE DRAWINGS

The above-mentioned features of the present disclosure will become more apparent with reference to the following description taken in conjunction with the accompanying drawings wherein like reference numerals denote like elements and in which:

FIG. 3 illustrates an itinerary of planned user experiences that may be inputted by the user to the client device illustrated in FIG. 2.

DETAILED DESCRIPTION

Figure 1:
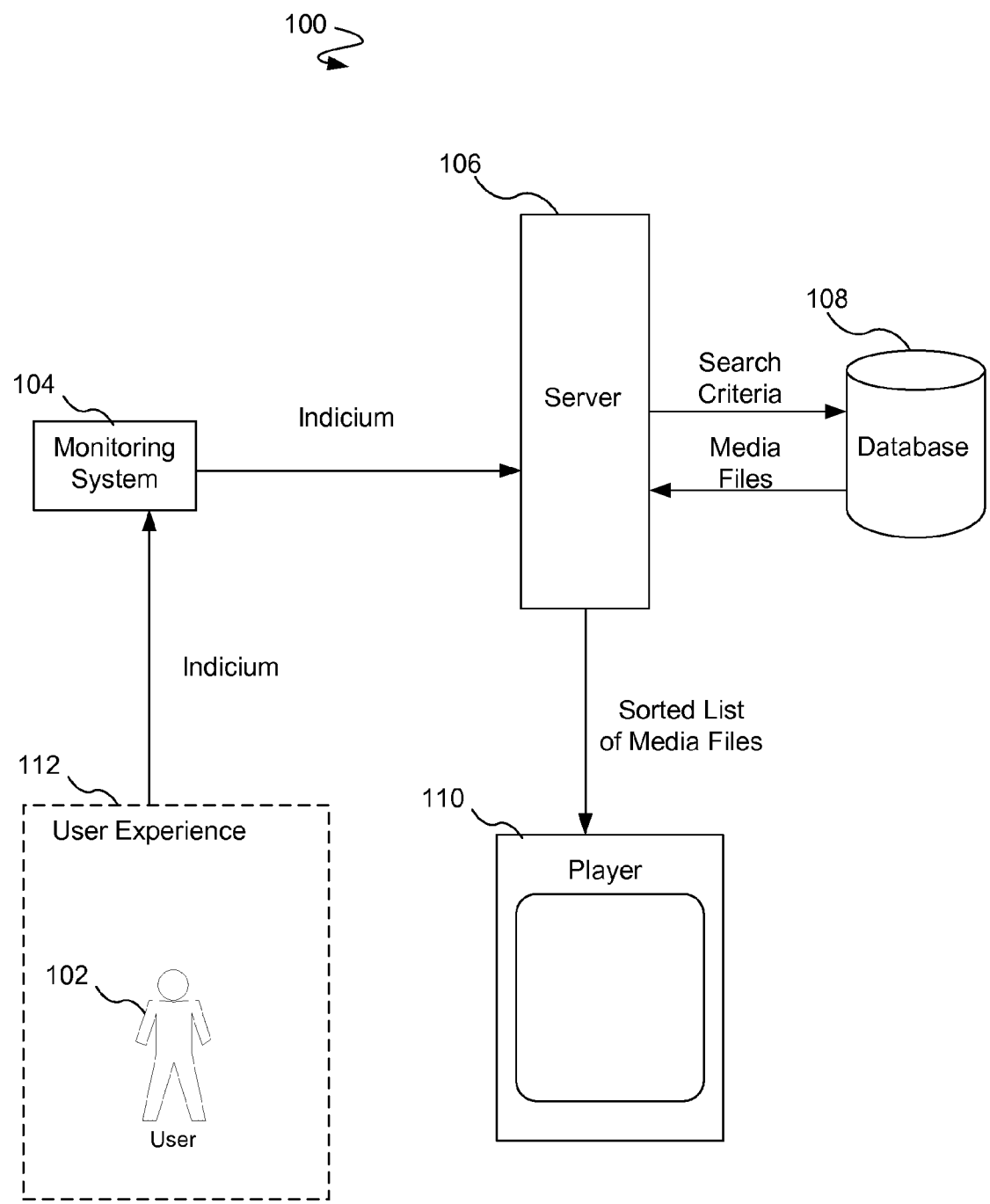
FIG. 1 illustrates a contextual media presentation configuration.

A contextual media presentation system provides media content to a user based upon a particular context. The context may be a user experience. A user experience is a person's perception and/or recollection of an event that happens at a particular time and place. The user experience may involve any of a variety of contextual components including but not limited to other people, animals, characters, activities, sounds, images, settings, smells, sensations, and emotions. The user experience may or may not be planned by the user prior to the user participating in the user experience.

As an example of a user experience that is not planned by the user, a theme park may have a theme park character that spontaneously interacts with the user. An indicium, e.g., time, place, and/or things known about the theme park character and/or activity, is monitored and recorded. For instance, a variety of image capture and sound recording systems may be utilized to record such indicia. The contextual media presentation system utilizes the indicia to search through a database to determine content that is associated with the user experience. When the user subsequently accesses a content delivery system, e.g., through a set top box, mobile device, etc., the user can access content that pertains to that particular theme park character, e.g., a movie with that theme park character that was selected by the contextual media presentation system based upon the user's experience. The user experience of the meet and greet with the theme park character is thereby enhanced by automatically providing content pertaining to that user experience to the user.

By utilizing user experiences as the basis for content determination, the contextual media presentation system does not rely on user preferences that may or may not be applicable. The contextual media presentation system utilizes the particular user experiences, planned or actually completed, to provide content consumption possibilities that enhance those particular user experiences whether or not the user has or has not established any user preferences. The content possibilities may help the user recall a past experience, or just as effectively to anticipate a future planned experience. As an example, a user receives media content associated with a theme park character for which the user has not established any user preference.

In one implementation, the contextual media presentation system sorts the content that is delivered based upon an order of the user experiences. For example, a user may meet and greet with different theme park characters in a theme park. The user may then have content waiting on a content delivery system in the order in which the user met and greeted with the different theme park characters.

As an example of a user experience that is planned, a user may plan a visit to a theme park and may arrange a scheduled itinerary of a sequence of theme park features to visit. The contextual media presentation system receives the itinerary and searches for media content corresponding to the theme park features. For instance, the media presentation system may find media content such as a movie that corresponds to the theme of the theme park feature. The media presentation system may then sort a list of media content according to the scheduled itinerary. Therefore, the user may watch and/or listen to media content that is ordered according to the scheduled itinerary of theme park features.

FIG. 1 illustrates a contextual media presentation configuration 100. A user 102 participates in a user experience 112. In many cases a good deal of context for user experience 112 can be known simply by knowing the place where the experience occurred. This is particularly true in an entertainment environment where experiences are to some degree orchestrated and engineered. Other context can be inferred from time, season, special events and holidays, weather, a priori knowledge about the user such as demographics and who the user is travelling with. Alternatively or in addition, a monitoring system 104 monitors the user during the user experience 112 to determine an indicium e.g., a theme park character, a theme park animatronic, a theme park show, a theme park feature, a theme park machine, an entertainment feature, items associated with the user experience, etc. The monitoring system 104 provides the indicium to a server 106. Such a system might be useful if one were to generate a sound track following a trip to a shopping mall, or a tour through a national park for example, where experiences are more ad hoc than in an entertainment environment.

A server 106 utilizes context information to determine (i.e., select) and sort a set of media files associated with or based on the user experiences. The server 106 searches through a database 108 for media files associated with the user experiences. To ease illustration and understanding, database 108 is illustrated as a single local entity, but it should be understood that it can be implemented as a local data storage, distributed data storage, cloud data storage, or any available storage and/or streaming technology that supports the selection and retrieval of suitable content, The association may be determined by a variety of factors other than the particular indicium such as a common character, a common genre, a common category, etc. The server 106 may also retrieve information about the user 102. For example, the server 106 may retrieve previously watched media content by the user 102 so that the server 106 does not include such media content in the set of media files.

In one implementation, the server 106 retrieves the media files and sends the media files to a player 110 for playback by the user 102. In an alternative implementation, the server 106 generates a playlist of media files. Rather than retrieving the media files, the server 106 identifies the media files for the user 102 to retrieve. The server 106 sends the playlist to the player 110, which then independently retrieves the media files listed in the playlist.

After retrieving associated media files or generating a playlist, the server 106 then sorts the retrieved media files or the playlist of media files based upon sorting criteria. The sorting criteria may be based upon the sequence of the user experiences, locations of the user experiences, etc.

The server 106 then sends the sorted media files or the sorted list of the media files to the player 110 for playback or for retrieval for playback. The player 110 may be a television, computer monitor, mobile device display, kiosk display, audio playback system, radio, etc. The user 102 may then select from a menu of the sorted list of media files so that the user may playback media content associated with the user experiences in a manner that enhances the actually completed user experiences.

Figure 2:
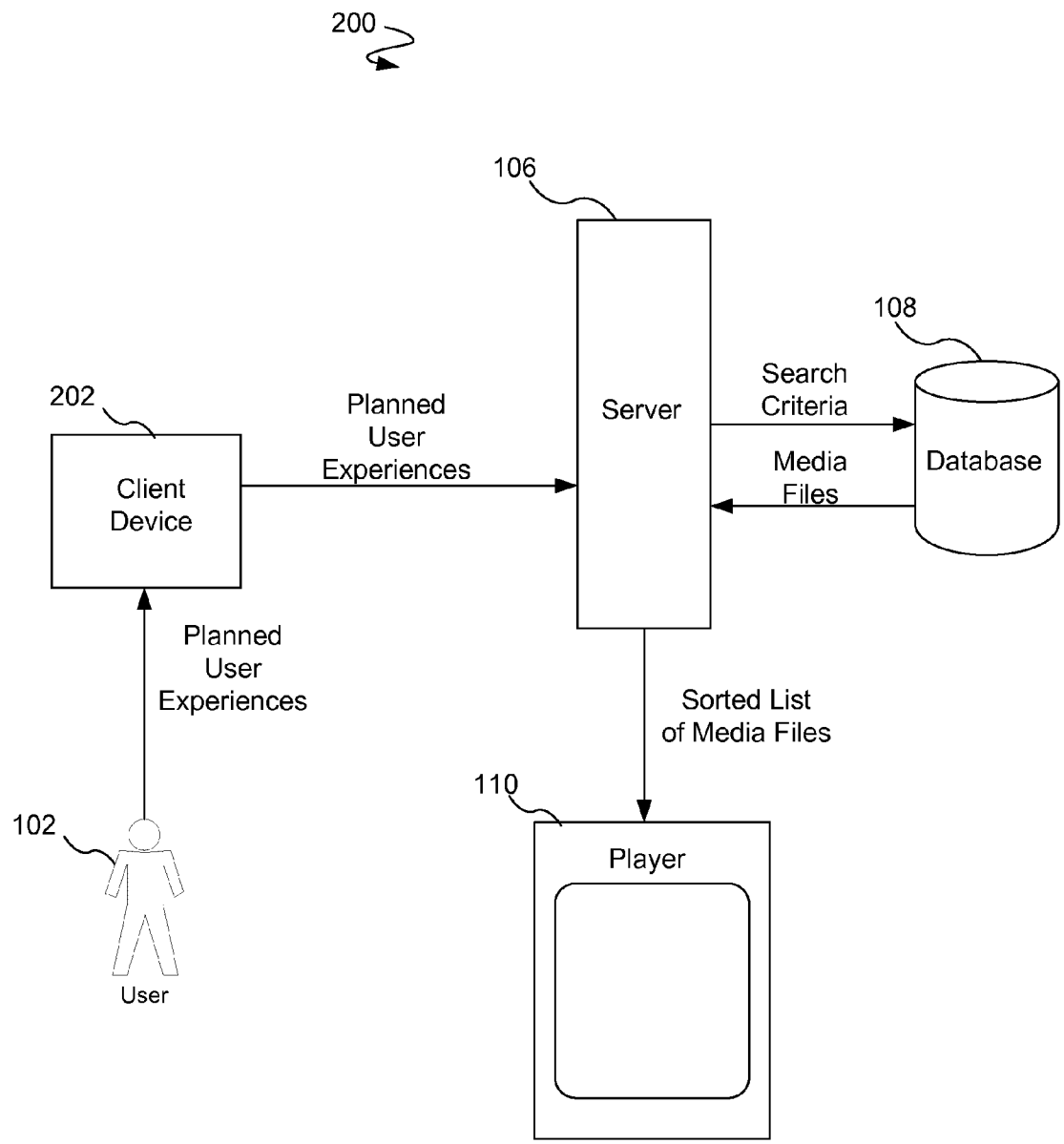
FIG. 2 illustrates an alternative contextual media presentation configuration to that of the contextual media presentation configuration illustrated in FIG. 1.

FIG. 2 illustrates an alternative contextual media presentation configuration 200 that functions to select content for delivery to a user based upon a plurality of planned user experiences, e.g., an itinerary. As an example, the user utilizes a client device 202 plan a set of theme park experiences for a future visit to a theme park. The user schedules the theme park experiences according to a planned itinerary so that some or all of the theme park experiences are scheduled to occur at planned times or within planned time windows. Alternatively, the user may be a reservation employee that performs the reservation for the user of the itinerary.

The client device 202 may be a computerized device such as a personal computer, laptop, smartphone, tablet device, etc. The client device 202 provides the planned user experiences to the server 106. The server 106 utilizes the expected context of the planned user experiences to select and sort a set of media files that are contextually relevant to the planned user experiences. The server 106 searches through the database 108 for media files associated with the planned user experiences. The association may be determined by a variety of factors other than the particular indicium such as a common character, a common genre, a common category, etc. The server 106 may also retrieve information about the user 102. For example, the server 106 may retrieve previously watched media content by the user 102 so that the server 106 does not include such media content when determining media files to provide to the user 102. After retrieving associated media files, the server 106 then sorts the media files based upon sorting criteria. The sorting criteria may be based upon the sequence of the planned user experiences, locations of the planned user experiences, etc.

The association may be determined by a variety of factors other than the particular indicium such as a common character, a common genre, a common category, etc. The server 106 may also retrieve information about the user 102. For example, the server 106 may retrieve previously watched media content by the user 102 so that the server 106 does not include such media content in the set of media files.

In one implementation, the server 106 retrieves the media files and sends the media files to a player 110 for playback by the user 102. In an alternative implementation, the server 106 generates a playlist of media files. Rather than retrieving the media files, the server 106 identifies the media files for the user 102 to retrieve. The server 106 sends the playlist to the player 110, which then independently retrieves the media files listed in the playlist.

The server 106 then sends the media files or the sorted list of the media files to the player 110 for playback by the user 102 or for retrieval by the user 102 for playback.

The user 102 may then select from a menu of the sorted list of media files so that the user may playback media content associated with the planned user experiences according to the sequence or location of the planned user experiences. In another embodiment, playback of the media content is automatically activated in sequence with the itinerary. Therefore, the anticipation of the plurality of planned user experiences is enhanced by media content associated with the planned user experiences prior to the user 102 participating in the planned user experiences, during the user participating in the planned user experiences, or subsequent to the user 102 participating in the planned user experiences. Alternatively, the user 102 may utilize the same client device 104 to order an itinerary of planned user experiences and play back the media files that the server 106 retrieves based upon contextual associations with the planned user experiences.

FIG. 3 illustrates an itinerary of planned user experiences. For example, the itinerary may include Theme Park Feature A, Theme Park Feature B, Theme Park Feature C, and Theme Park Feature D.

Figure 4:
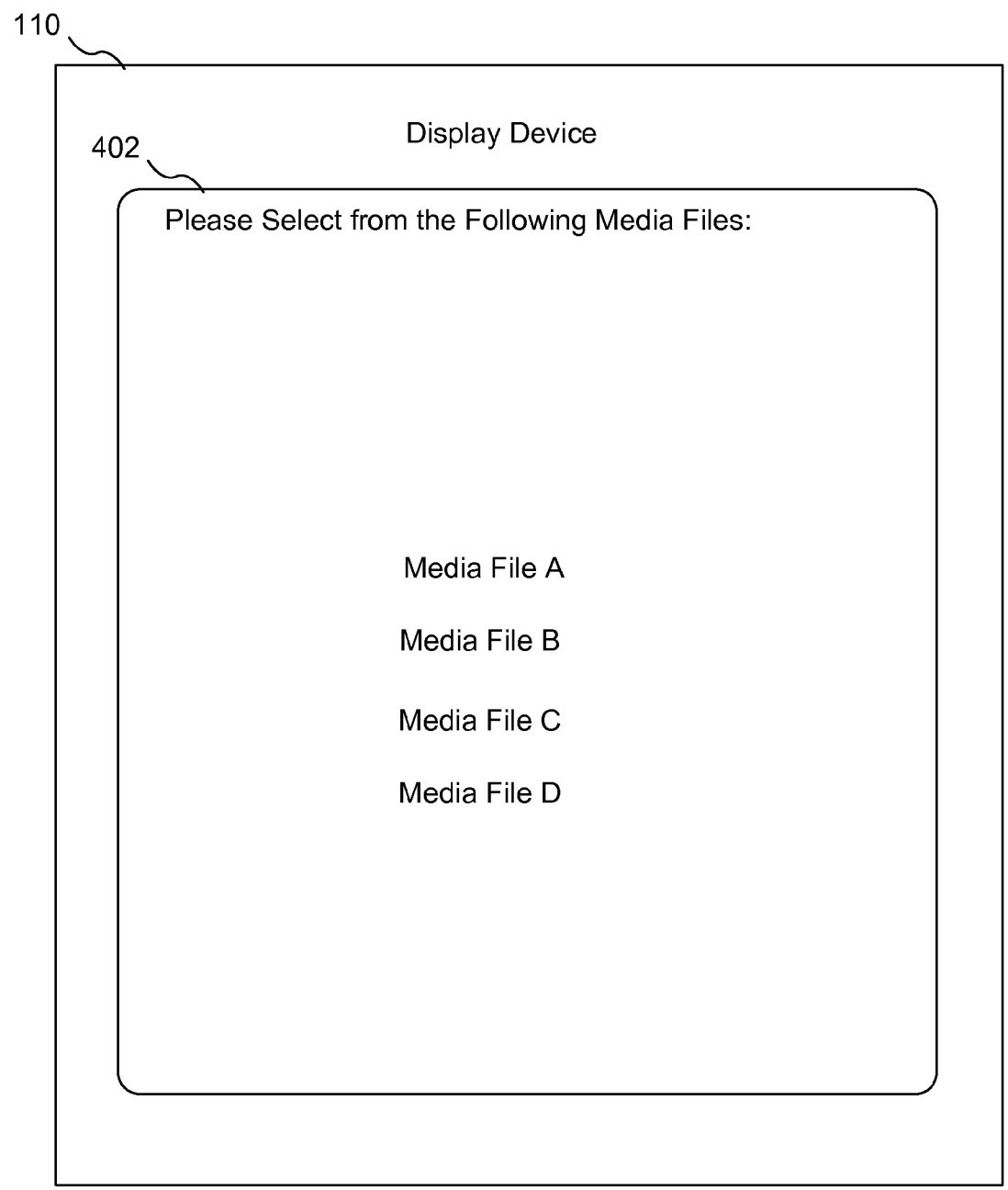
FIG. 4 illustrates an example of a display screen displayed by the display device illustrated in FIGS. 1 and 2.

FIG. 4 illustrates an example of a display screen 402 implemented by the player 110 illustrated in FIG. 1 and FIG.

2. The display screen 402 provides a menu of sorted media files such as Media File A, Media File B, Media File C, and Media File D. In this example, the media files have been selected and sorted according to sorting criteria based upon the itinerary of user experiences. An itinerary can be used for contextual information about past actual experiences as well as future planned experiences. Accordingly, the Media File A is associated with Theme Park Experience A, the Media File B is associated with Theme Park Experience B, the Media File C is associated with Theme Park Experience C, and the Media File D is associated with Theme Park Experience D. Alternatively, the media files are sorted according to actual user experiences that are not planned, but for which contextual information has been otherwise obtained.

In an embodiment, the contextual media presentation system updates the sorted list of media files based upon updates to the sequence and/or location of the user experiences. For example, the user 102 illustrated in FIG. 2 may decide to change the sequence of the planned user experiences because of weather conditions. For instance, the user 102 may decide to visit Theme Park Experience D illustrated in FIG. 3 prior to Theme Park Experience C illustrated in FIG. 3. Accordingly, the user 102 or a reservation employee utilizes the client device 102 to update the planned user experiences. The user 102 then receives an updated sorted list of the media files at the display device 110 illustrated in FIG. 1 or the integrated display device 202 illustrated in FIG. 2. The updated sorted list of the media files sorts the list to display Media File D prior to Media File C.

Figure 5:
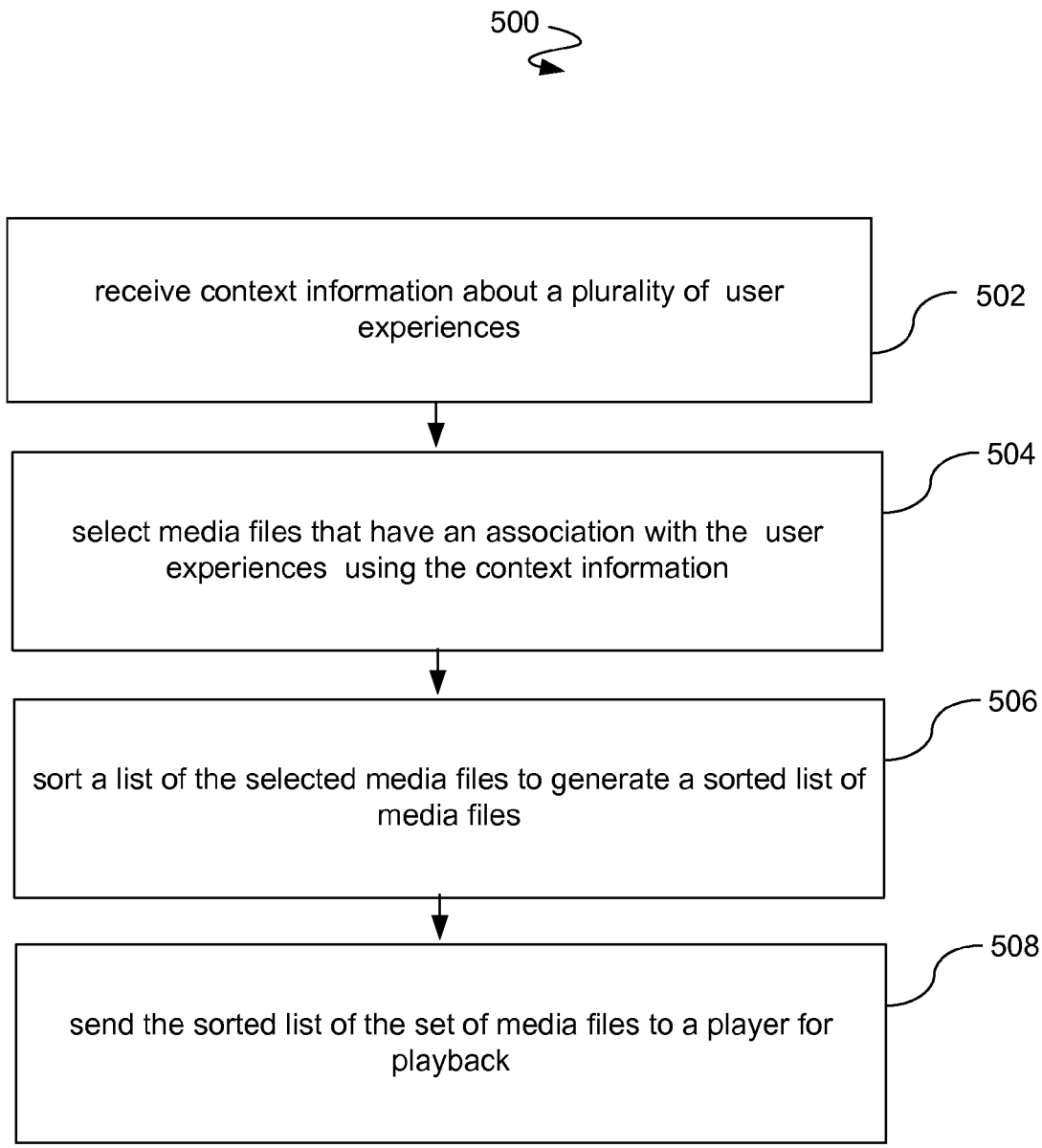
FIG. 5 illustrates a process that is utilized to provide a contextual media presentation.

FIG. 5 illustrates a process 500 that implements a contextual media presentation. At 502, contextual information about a plurality of user experiences is received. An example of contextual information is particular seating information for the user 102 at a particular time during a theme park feature such as a show. Events that happen during the show, e.g., appearances by certain theme park characters, are recorded. At 504, a plurality of media files is selected that are contextually relevant to the received user experiences. As an example, movies having the theme park characters are selected. The media files may include content other than movies, such as cartoons, news, music, previews, etc. At 506, the identified contextually relevant media files are sorted, arranged or otherwise edited to generate a sorted list of media files. The list of media files is arranged for contextual continuity, e.g., a temporal order that follows from the temporal order of the user experiences. At 508 the sorted list of media files is provided to the user for playback.

The processes described herein may be implemented in a general, multi-purpose or special purpose processor. Such a processor will execute instructions, either at the assembly, compiled or machine-level, to perform the processes. Those instructions can be written by one of ordinary skill in the art following the description herein and stored or transmitted on a computer readable medium or a computer readable storage device. The instructions may also be created using source code or a computer-aided design tool. A computer readable medium may be any medium capable of carrying those instructions and include a CD-ROM, DVD, magnetic or other optical disc, tape, silicon memory, e.g., removable, non-removable, volatile or non-volatile, packetized or non-packetized data through wireline or wireless transmissions locally or remotely through a network. A computer is herein intended to include any device that has a general, multi-purpose or single purpose processor as described above. For example, a computer may be a personal computer ("PC"), laptop, smartphone, tablet device, set top box, kiosk, or the like.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

We claim:

1. A method comprising:
receiving context information about a plurality of user experiences that occur at a real world place and time without use of a computing device by a user associated with the plurality of user experiences;
selecting media files that have an association with the user experiences using the context information;
sorting a list of the selected media files to generate a sorted list of media files; and
sending the sorted list of the set of media files to a player for playback.

2. The method of claim 1, further comprising receiving an updated sequence of the plurality of user experiences, sorting the list of the plurality of media files to generate an updated sorted list of media files, and sending an updated sorted list of the set of media files to the player for playback.

3. The method of claim 1, wherein the player retrieves the set of media files according to the sorted list for playback, the sorted list identifying the set of media files.

4. The method of claim 1, wherein the sorted list comprises the set of media files for playback.

5. The method of claim 1, wherein the sorting is based upon a scheduled sequence of the plurality of user experiences.

6. The method of claim 1, wherein the sorting is based upon a plurality of locations associated with each user experience of the plurality of user experiences.

7. The method of claim 1, wherein the sorting is based upon information about the user.

8. The method of claim 1, wherein the plurality of user experiences comprises an itinerary of planned user experiences.

9. The method of claim 1, wherein the context information is selected from the group consisting of: location, time, seasons, events, weather, and information about the user.

10. A computer program product comprising a computer readable storage device having a computer readable program stored thereon, wherein the computer readable program while executing on a computer causes the computer to:
receive context information about a plurality of user experiences that occur at a real world place and time without use of a computing device by a user associated with the plurality of user experiences;
select media files that have an association with the user experiences using the context information;
sort a list of the selected media files to generate a sorted list of media files; and
send the sorted list of the set of media files to a player for playback.

11. The computer program product of claim 10, wherein the computer is further caused to receive an updated sequence of the plurality of user experiences, sort the list of the plurality of media files to generate an updated sorted list of media files according to the sorting criteria, and send an updated sorted list of the set of media files to the player for playback.

12. The computer program product of claim 10, wherein the player retrieves the set of media files according to the sorted list for playback, the sorted list identifying the set of media files.

13. The computer program product of claim 10, wherein the sorted list comprises the set of media files for playback.

14. The computer program product of claim 10, wherein the sorting is based upon a selection from the group consisting of a sequence of the plurality of user experiences, a plurality of locations associated with each user experience of the plurality of user experiences, and information about the user.

15. The computer program product of claim 10, wherein the plurality of user experiences is an itinerary of planned user experiences.

16. The computer program product of claim 10, wherein the association is based upon a common character, a common genre, and/or a common category.

17. An apparatus comprising:
    a processor that receives context information about a plurality of user experiences that occur at a real world place and time without use of a computing device by a user associated with the plurality of user experiences, selects media files that have an association with the user experiences using the context information, sorts a list of the selected media files to generate a sorted list of media files, and sends the sorted list of the set of media files to a player for playback.

18. The apparatus of claim 17, wherein the processor further receives an updated sequence of the plurality of user experiences, sorts the list of the plurality of media files to generate an updated sorted list of media files according to the sorting criteria, and sends an updated sorted list of the set of media files to the player for playback.

19. The apparatus of claim 17, wherein the player retrieves the set of media files according to the sorted list for playback, the sorted list identifying the set of media files.

20. The apparatus of claim 17, wherein the sorting criteria is based upon a sequence of the plurality of user experiences.

21. The apparatus of claim 17, wherein the sorted list comprises the set of media files for playback.

22. The apparatus of claim 17, wherein the sorting is based upon a selection from the group consisting of a sequence of the plurality of user experiences, a plurality of locations associated with each user experience of the plurality of user experiences, and information about the user.

23. The apparatus of claim 17, wherein the plurality of user experiences comprises an itinerary of planned user experiences.

24. The apparatus of claim 17, wherein the association is based upon a common character, a common genre, and/or a common category.

* * * * *